(12) United States Patent
Dechristopher et al.

(10) Patent No.: US 10,837,712 B1
(45) Date of Patent: Nov. 17, 2020

(54) MULTI-BORE CONSTANT CONDUCTANCE HEAT PIPE FOR HIGH HEAT FLUX AND THERMAL STORAGE

(71) Applicant: ADVANCED COOLING TECHNOLOGIES, INC., Lancaster, PA (US)

(72) Inventors: Michael Dechristopher, Leola, PA (US); William G. Anderson, Bound Brook, NJ (US); Jens E. Weyant, Hershey, PA (US); Calin Tarau, Downingtown, PA (US); Andrew J. Slippey, Grove City, PA (US)

(73) Assignee: ADVANCED COOLING TECHNOLOGIES, INC., Lancaster, PA (US)

( * ) Notice: Subject to any disclaimer, the term of this patent is extended or adjusted under 35 U.S.C. 154(b) by 399 days.

(21) Appl. No.: 15/093,428

(22) Filed: Apr. 7, 2016

Related U.S. Application Data

(60) Provisional application No. 62/147,812, filed on Apr. 15, 2015.

(51) Int. Cl.
| | |
|---|---|
| *F28D 15/00* | (2006.01) |
| *F28D 15/02* | (2006.01) |
| *F28D 15/04* | (2006.01) |
| *F28F 1/40* | (2006.01) |
| *F28D 20/02* | (2006.01) |
| *B64G 1/50* | (2006.01) |

(52) U.S. Cl.
CPC ......... *F28D 15/0266* (2013.01); *B64G 1/506* (2013.01); *F28D 15/0233* (2013.01); *F28D 15/0275* (2013.01); *F28D 15/046* (2013.01); *F28D 20/021* (2013.01); *F28F 1/40* (2013.01)

(58) Field of Classification Search
CPC ............ F28D 15/0275; F28D 15/0266; F28D 15/0233; F28D 15/046; B64G 1/506
See application file for complete search history.

(56) References Cited

U.S. PATENT DOCUMENTS

| | | | |
|---|---|---|---|
| 4,583,587 | A | 4/1986 | Alario et al. |
| 6,889,755 | B2 | 5/2005 | Zuo et al. |
| 7,845,394 | B2 | 12/2010 | Chang et al. |
| 8,459,341 | B2 | 6/2013 | Chang et al. |
| 8,720,530 | B2 | 5/2014 | Asfia et al. |
| 8,919,427 | B2 | 12/2014 | Wang et al. |

(Continued)

FOREIGN PATENT DOCUMENTS

| | | |
|---|---|---|
| CN | 100498187 A | 7/2007 |
| CN | 101055151 A | 10/2007 |

(Continued)

*Primary Examiner* — Elizabeth J Martin
*Assistant Examiner* — Nael N Babaa
(74) *Attorney, Agent, or Firm* — McNees Wallace & Nurick LLC

(57) ABSTRACT

A heat pipe device comprising at least two of the following: an axially grooved bore for thermal transport, the axially grooved bore having an axial groove wick; a phase change material bore for thermal storage, the phase change material bore having internal fins to enhance heat transfer, the internal fins extend along the axis of the phase change material bore; and a porous media bore for accepting high heat fluxes, the porous media bore having a porous media wick in areas of high heat flux.

19 Claims, 3 Drawing Sheets

(56) References Cited

U.S. PATENT DOCUMENTS

| | | |
|---|---|---|
| 2006/0207750 A1* | 9/2006 | Chang .................. F28D 15/046 165/104.26 |
| 2007/0107877 A1 | 5/2007 | Hou et al. |
| 2009/0020269 A1 | 1/2009 | Chang et al. |
| 2009/0103266 A1* | 4/2009 | Huettner ................. F28D 15/00 361/698 |
| 2011/0048683 A1 | 3/2011 | Chang et al. |
| 2012/0048517 A1 | 3/2012 | Huang et al. |
| 2012/0227935 A1 | 9/2012 | Huang |
| 2013/0294557 A1* | 11/2013 | Perkins ..................... H05H 3/06 376/115 |
| 2014/0060781 A1* | 3/2014 | Jia ........................... F28D 15/04 165/104.26 |
| 2015/0232681 A1* | 8/2015 | Osako .................. C09D 129/04 165/133 |

FOREIGN PATENT DOCUMENTS

| | | |
|---|---|---|
| CN | 101055158 A | 10/2007 |
| CN | 201787845 U | 4/2011 |
| CN | 202304520 U | 7/2012 |
| CN | 102706191 A | 10/2012 |
| CN | 103075905 A | 5/2013 |
| CN | 103079381 A | 5/2013 |
| EP | 1857762 A1 | 11/2007 |
| JP | 2006057927 A | 3/2006 |
| KR | 20100132212 A | 12/2010 |
| WO | 2010/060302 A | 6/2010 |

* cited by examiner

MULTI-BORE CONSTANT CONDUCTANCE HEAT PIPE FOR HIGH HEAT FLUX AND THERMAL STORAGE

FIELD OF THE INVENTION

The present invention is directed to a heat pipe for applications which experience high heat flux and require thermal storage. In particular, the heat pipe has multiple bores, with respective bores which containing wicks and other respective bores which contain thermal storage material.

BACKGROUND OF THE INVENTION

Constant Conductance Heat Pipes (CCHPs) are widely used in satellite thermal control. They are often manufactured with an extruded aluminum envelope with interior grooves for a wick. The working fluid is typically anhydrous ammonia. CCHPs typically transport up to several hundred watts and can be up to several meters long.

Conventional CCHPs have at least two short comings related to heat flux and thermal storage. The maximum evaporator heat flux in the CCHPs is relatively low, on the order of 5 W/cm2. At higher heat fluxes, boiling in the evaporator grooves can disrupt the liquid return, causing the heat pipe to dry out. In addition, CCHPs cannot store latent energy. A heat pipe can only store a minimal amount of sensible heat.

Typical grooved wicks, used in spacecraft CCHPs, diodes, and Variable Conductance Heat Pipes (VCHPs) have a very high permeability, allowing very long heat pipes for operation in zero-g, typically several meters long. However, axial grooved CCHPs have a relatively low heat flux limitation, on the order of 5 W/cm2 before the heat pipe conductance drops off.

Theses grooved aluminum/ammonia heat pipes are designed to work with a 0.10 inch adverse elevation (evaporator elevated above the condenser). This allows them to be tested on earth prior to insertion in a spacecraft. However, they are very sensitive to adverse elevation. For example, increasing the heat pipe elevation by 0.100 inch will significantly decrease the power.

For applications with higher heat fluxes or with adverse elevation, loop heat pipes (LHPs) are currently used in place of CCHPs. The disadvantage of LHPs is that they are significantly more expensive to fabricate and often are more difficult to start-up, sometimes requiring start-up heaters.

Thermal storage is of interest for both manned and unmanned spacecraft for several reasons. The major reason is that the effective sink conditions can vary widely while, for example, orbiting the earth or the moon. For example, the thermal control system must be able to adjust to times when the space craft is in sunlight, and when it is behind the planet, and in shadow. The standard approach is to design a radiator to work at the hottest conditions, which requires the largest size radiator.

During cold conditions, it is often necessary to provide controls to prevent the electronics being cooled by the heat pipe from becoming too cold. Heaters are often used to prevent the radiator from freezing, requiring electrical power when little power is generated by the solar cells.

Many thermal storage systems use a Phase Change Material (PCM), such as a wax or a hydrated salt. Initially, the phase change material is solid. When thermal storage is needed, the phase change material melts, absorbing heat by the latent heat of the phase change. The phase change material is then frozen again when conditions permit. However, most thermal storage materials have relatively low thermal conductivity, on the order of 1 W/m K, compared with roughly 200 W/m K for aluminum. Because of this, the typical thickness of the phase change material is limited in the direction perpendicular to the heat. In addition, some method for enhancing the conductivity is often required, typically using fins or carbon foam.

It would, therefore, be beneficial to provide a system which can accept high heat fluxes and which can transmit heat over a long distance. In addition, it would be beneficial to provide a system which provides adequate thermal storage.

SUMMARY OF THE INVENTION

An object is to provide a system or heat pipe device which can accept high heat fluxes and which can transmit heat over a long distance.

An object is to provide a system or heat pipe device which provides adequate thermal storage.

An embodiment is directed to heat pipe device which includes at least two of the following: a bore for thermal transport; a bore for thermal storage having internal fins provided in the bore for thermal storage; and a bore for accepting high heat fluxes.

In one embodiment, the fins in the bore for thermal storage run along the axis of the in the bore for thermal storage and are continuous. The bore for thermal storage may include phase change material.

In one embodiment, the bore for thermal transport includes an axial groove wick. A portion of the bore for thermal transport includes a porous media wick.

In one embodiment, the bore for accepting high heat fluxes includes a porous media wick in areas of high heat flux and a grooved wick in areas of heat delivery.

In one embodiment, the bore for thermal storage or the bore for accepting high heat fluxes is in thermal contact with the bore for thermal transport.

An embodiment is directed to a heat pipe device comprising at least two of the following: an axially grooved bore for thermal transport; a phase change material bore for thermal storage, the phase change material bore having internal fins to enhance heat transfer; and a porous media bore for accepting high heat fluxes.

In one embodiment, the heat pipe device is a dual bore heat pipe device with the porous media bore and the axially grooved bore. In another embodiment, the heat pipe device is a triple bore heat pipe device with the phase change material bore, the axially grooved bore and the porous media bore.

An embodiment is directed to a heat pipe device comprising at least two of the following: an axially grooved bore for thermal transport, the axially grooved bore having an axial groove wick; a phase change material bore for thermal storage, the phase change material bore having internal fins to enhance heat transfer, the internal fins extend along the axis of the phase change material bore; and a porous media bore for accepting high heat fluxes, the porous media bore having a porous media wick in areas of high heat flux.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
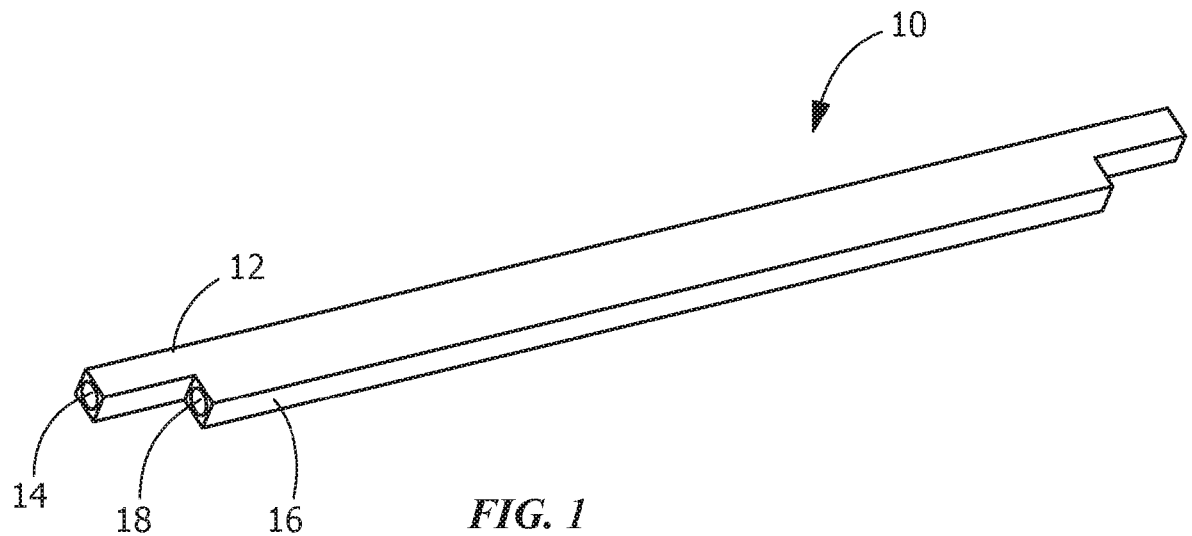
FIG. 1 is a perspective view of one illustrative embodiment of a multi-bore heat pipe or heat pipe device according to the present invention.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the preferred embodiments. Accordingly, the invention expressly should not be limited to such preferred embodiments illustrating some possible non-limiting combination of features that may exist alone or in other combinations of features; the scope of the invention being defined by the claims appended hereto.

In general, the embodiments are directed a heat pipe device 10 with at least two bores. The bores can be used for locally high heat fluxes, to transport heat over long distances, to accommodate transient heat loads and sink conditions, or a combination thereof. The heat pipe device 10 can be formed in one piece with multiple bores provided therein. Alternatively, the heat pipe device 10 can include multiple heat pipes which are mechanically and thermally joined together for form the heat pipe device 10.

Figure 2:
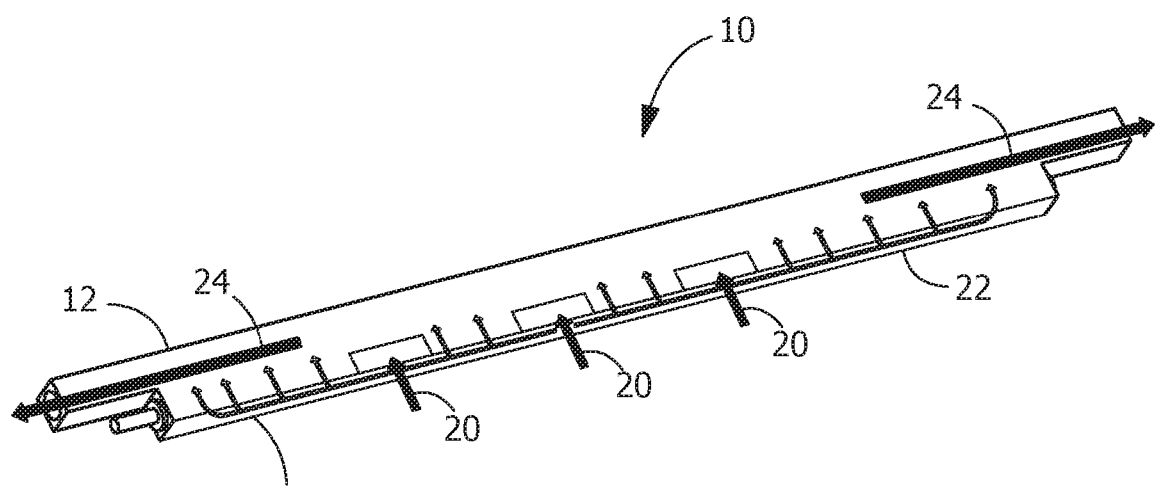
FIG. 2 is a diagrammatic view of the heat pipe device of FIG. 1, illustrating the distribution of heat applied to the heat pipe device.

Referring to FIGS. 1 and 2, an illustrative heat pipe device 10 is shown with a first heat pipe 12 having a first bore 14 and a second heat pipe 16 having a second bore 18. The first and second heat pipes 12, 16 and or the envelope material of the heat pipe device 10 are made from thermally conductive material, such as, but not limited to, aluminum, stainless steel, titanium and copper. The first and second heat pipes 12, 16 are placed in thermal engagement with each other to form the heat pipe device 10. In the embodiment shown, the first bore 14 is an axially grooved bore and the second bore 18 is a porous media bore.

Figure 4:
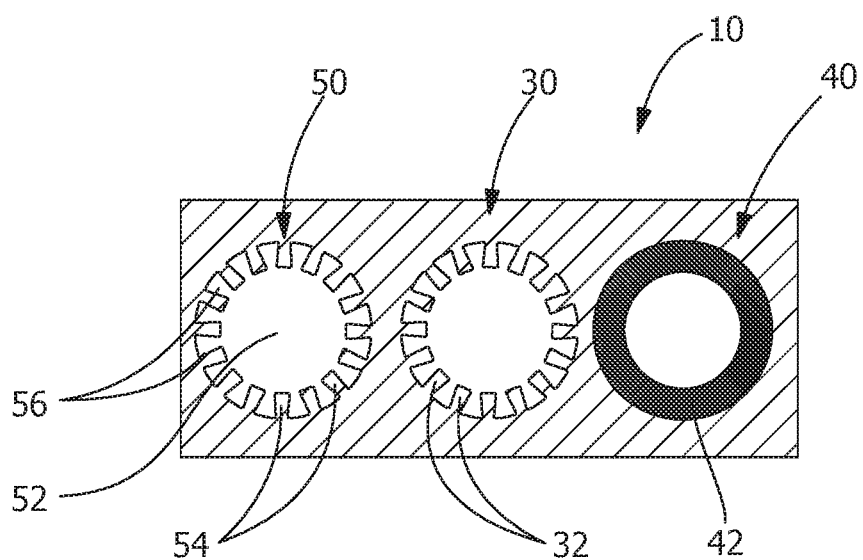
FIG. 4 is a cross-sectional view of the heat pipe device of FIG. 3, illustrating the three bores.

In other illustrative embodiments, the first bore 14 may be, but is not limited to, one of the following: an axially grooved bore, similar to bore 30 shown in FIG. 4; a porous media bore, similar to bore 40 shown in FIG. 4; or a phase change material bore, similar to bore 50 shown in FIG. 4. The second bore 18 may be, but is not limited to, one of the following: an axially grooved bore, similar to bore 30 shown in FIG. 4; a porous media bore, similar to bore 40 shown in FIG. 4; or a phase change material bore, similar to bore 50 shown in FIG. 4. The first bore 14 and second bore 18 may have similar inner bore diameters or may have different inner bore diameters. The inner bore diameter may be approximately 1 mm or greater than 1 mm.

Although a two bore heat pipe device 10 is shown in FIGS. 1 and 2, the heat pipe device may have 2 bores, 3 bores, or more than 3 bores. Each of the respective bores may be, but are not limited to, one of the following: an axially grooved bore, similar to bore 30 shown in FIG. 4; a porous media bore, similar to bore 40 shown in FIG. 4; or a phase change material bore, similar to bore 50 shown in FIG. 4.

A heat pipe having an axially grooved bore 30 (FIG. 4) with capillary grooves 32 has a very high permeability, allowing for operation in zero-g. The capillary grooves 32 of the axially grooved bores allow heat to be transported over long distances, typically several meters long or longer. The capillary grooves 32 act as a wick having a large pore size. The large pore size is responsible for the high permeability of the axially grooved bore, but results in low pumping capability, thereby causing the axially grooved bores to have a relatively low heat flux limitation. Consequently, heat pipes or heat pipe devices having axially grooved bores are suitable for use in space, or for use in gravity aided sections of a heat pipe or heat pipe device. The axially grooved bore 30 allows the heat pipe device 10 to carry power over long distances, such as to an ultimate heat sink.

Figure 5:
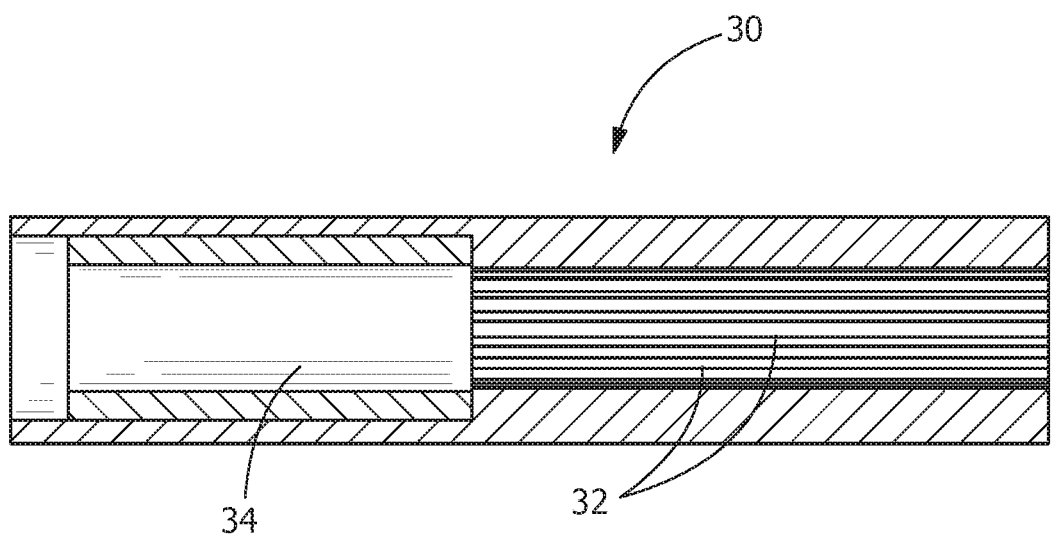
FIG. 5 is a cross-sectional view of one illustrative embodiment of a transport bore which contains both a grooved wick and a porous wick.

While the axially grooved bore 30 is shown having capillary grooves 32 provided along the entire length, other configurations may be used. Such other configurations, include, but not limited to, the axially grooved bore having a combination capillary grooves 32 and porous wicks 34. As shown in FIG. 5, the axially grooved bore has a porous wick 34 at the end of the heat pipe to accept a higher heat flux at the end of the heat pipe. Such heat pipes are disclosed in co-pending U.S. patent application Ser. No. 13/506,623, which is incorporated by reference herein in its entirety.

A heat pipe having a porous wick or media bore 40 is capable of accepting high heat fluxes, typically 50 W/cm$^2$ or higher. The porous media bore 40 includes porous wick 42 provide about the periphery thereof. Examples of the wick materials include, but are not limited to, screen or sintered powder. As shown in FIG. 1, the high heat fluxes can be applied in one or more discrete locations, as indicted by arrows 20. The working fluid in the second bore 18, which is a porous media bore, evaporates where heat is supplied. The vapor travels to locations near the other bore or bores, as indicted by arrows 24, and condenses. By this action, the first bore 14 is subjected to a lower, more uniform heat flux.

While the porous wick or media bore 40 is shown having a porous wick 42 provided along the entire length, other configurations may be used. Such other configurations include, but not limited to, the porous wick or media bore having a combination of porous wicks 42 in areas of high heat flux and grooved wicks in areas of heat delivery.

The thermal storage or phase change material bore 50 includes thermal storage material, such as phase change material 52 provided in the bore 50. The phase change material bore 50 is capable of storing energy. This phase change material bore 50 can absorb transient heat loads, store the energy and ultimately reject heat through other bores.

In various illustrative embodiments, axial fins 54 are provided. The axial fins 54 are used to add and remove heat radially from the phase change material along the full length of the bore. The axial fins 54 are axial along the length of the phase change material bore 50 and can be extruded during the manufacturing process. The fins 54 may be, but are not limited to, continuous and extend along the axis of the phase change material bore, or may be pin fins. Axial fins 54 are desirable because the phase change material thermal conductivity is very low, on the order of 1 W/m K, versus 200 W/m K for axial fins made from aluminum.

Axial fins 54 can help distribute the phase change material 52 more evenly by capillary action. When the phase change material 52 melts, its volume can increase by 10 percent or more. To prevent over pressuring the bore 50, the volume of the phase change material 52 is chosen so that liquid phase change material does not fill the entire volume of the bore 50 at the maximum temperature. Consequently, when the phase change material 52 freezes and solidifies, voids are formed in the phase change material 50. Over time, the phase change material 52 can migrate causing the solidified phase change material to concentrate in a region. This is especially possible in micro-gravity, where there are no gravitational forces to redistribute the phase change material 52. Grooves 56 provided between the axial fins 54 cooperate with the phase change material 52 to carry or move the liquid phase change material into these void regions by capillary action when the phase change material 52 is melted, thereby redistributing the phase change material more evenly. This is similar to the behavior of liquid in a grooved pipe. In order to facilitate this movement of the phase change material, the fins 54 are spaced apart for example, but not limited to, 0.025 inches or less.

Figure 3:
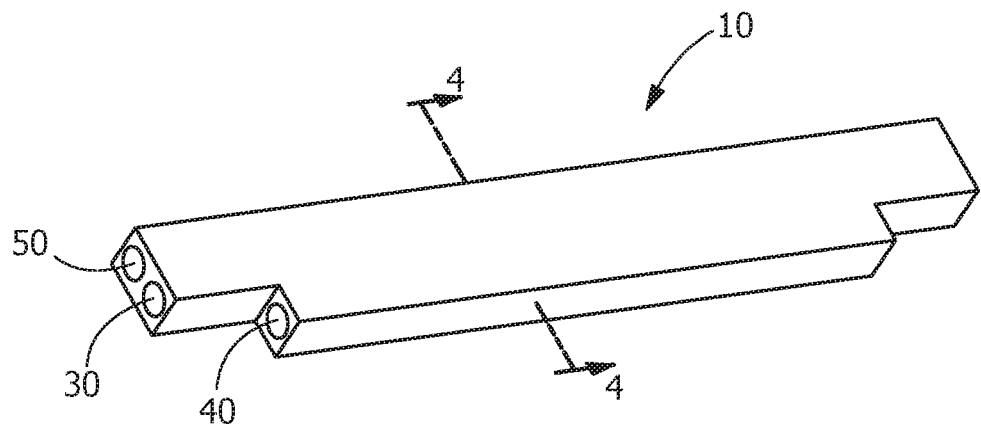
FIG. 3 is a perspective view of second illustrative embodiment of a multi-bore heat pipe or heat pipe device according to the present invention, the heat pipe device having three bores.

In one illustrative embodiment as shown in FIGS. 3 and 4, one axially grooved bore 30 will be used to transmit heat over a long distance. The axially grooved bore 30 will have axial grooves 32 in the condenser, and axial grooves 32 or a porous wick 34 in the evaporator. One or more porous media bores 40 can contain a porous wick 42 that can accept heat fluxes above those that can be handled by a grooved wick. If thermal storage is required, one or more thermal storage material bores 50 having thermal storage material, such as, but not limited to phase change material 52 will be provided.

In operation, heat is supplied and removed from one or more heat pipe bores of the heat pipe device. The axially grooved bore(s) and/or the porous media bore(s) are charged with a working fluid and provide very high effective thermal conductivity (+10,000 W/m) between heat source and heat sink. Typical working fluids of the axially grooved and porous media bores, include, but are not limited to, anhydrous ammonia, water, methanol, propylene, ethane or toluene. The gradient from heat input to heat rejection interfaces is typically only 1-3° C. The phase change material bore(s) is charged with phase change material with a melting temperature suitable to the system level thermal requirements (typically −80° C. to 110° C.). Typical thermal storage materials in the phase change material bore include, but are not limited to, organic, inorganic and hydrated salts. The axially grooved bore(s) and/or the porous media bore(s) moves heat from the heat source to the phase change material bore and/or the ultimate heat sink depending on the operating conditions and the quality of the phase change material.

In various illustrative embodiments, the heat pipe device is capable of passive set point thermal control. As heat is applied to the device, the heat source temperature is held nearly constant at the melting temperature of the phase change material. The heat source temperature will remain constant as long as the phase change material volume is not completely melted and the heat sink is capable of rejecting the heat load. During this operating condition, the heat source power may increase or decrease over time with no significant change in temperature. Once the phase change material volume is completely melted the system can no longer maintain a constant temperature of the heat source with increase or decrease in power. When the heat load is reduced or sink conditions become more favorable, the phase change material will freeze and the passive set point thermal control will resume.

As previously stated, various configurations or combinations of bores may be used in a multiple bore heat pipe device. As in example, the dual bore heat pipe device may include a phase change material bore 50 and axially grooved bore 30. This device is used for thermal storage and typical heat flux applications.

Alternatively, as shown in FIGS. 1 and 2, the dual bore heat pipe device may include an axially grooved bore 30 and a porous wick or media bore 40. This device is used in applications in which high heat flux is applied to the porous wick bore 40, as illustrated by the arrows 20 in FIG. 2. The heat is rejected at a lower heat flux to the axially grooved bore 30, as illustrated by the arrows 22 in FIG. 2. The porous wick bore 40 is capable of operating at higher heat fluxes (up to 50 Watts/cm$^2$ or more) as compared to axial grooved wicks 30. Heat from the porous wick bore 40 is transmitted to the grooved wick bore 30. The benefit is that the porous wick bore 40 acts as a flux transformer, accepting a high heat flux over one or more small areas, and supplying the heat to the grooved bore 30 over the entire length of the porous wick bore 40 (as illustrated by arrows 24).

The triple bore heat pipe device 10 shown in FIGS. 3 and 4 includes a phase change material bore 50, an axially grooved bore 30 and porous wick bore 40. This device 10 is used for high heat flux, long heat transport and transient heat load applications. In this example, the phase change material bore 50 is provided for thermal storage, the grooved wick bore 30 is provided for long distance transport, and the porous wick bore 40 is provided for accepting high heat fluxes and distributing the heat to the grooved wick bore 30. The phase change material bore 50 is in thermal contact with the grooved wick bore 30. The grooved wick bore 30 is in thermal contact with the porous wick bore 40.

Alternatively, a heat pipe device with more than three bores may include one or more phase change material bores, one or more axially grooved bores, and/or one or more porous wick bores.

While the invention has been described with reference to a preferred embodiment, it will be understood by those skilled in the art that various changes may be made and equivalents may be substituted for elements thereof without departing from the spirit and scope of the invention of the invention as defined in the accompanying claims. In particular, it will be clear to those skilled in the art that the present invention may be embodied in other specific forms, structures, arrangements, proportions, sizes, and with other elements, materials, and components, without departing from the spirit or essential characteristics thereof. One skilled in the art will appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

The invention claimed is:

1. A heat pipe device adapted for use in microgravity comprising at least two of the following:
   a first bore being an axially grooved bore having opposed ends, the first bore having a first capacity for accepting heat flux from an external environment between the opposed ends of the first bore, and a first capacity for thermal storage;
   a second bore having a second capacity for accepting heat flux from the external environment, a second capacity for thermal storage, and internal fins to enhance heat transfer, the second bore being less than completely filled with liquid phase change material at a predetermined temperature, the phase change material operating between a liquid state and a solid state; and
   a third bore having opposed ends, the third bore having a third capacity for accepting heat flux from the external environment greater than 15 W/cm$^2$ between the opposed ends of the third bore and a third capacity for thermal storage,
   wherein:
      the first capacity for accepting heat flux from the external environment is less than the third capacity for accepting heat flux from the external environment;
      the second capacity for thermal storage is greater than the first capacity for thermal storage and is greater than the third capacity for thermal storage;
      the first bore is arranged and disposed to transfer thermal energy farther than the second bore and the third bore;
      the second bore is arranged and disposed to store more thermal energy than the first bore and the third bore; and
      the third bore is arranged and disposed to accept greater heat flux than the first bore and the second bore.

2. The heat pipe device according to claim 1, wherein the fins in the second bore run along the axis of the second bore, and are continuous.

3. The heat pipe device according to claim 2, wherein the spacing between the fins is less than 0.025 inch.

4. The heat pipe device according to claim 1, wherein the first bore includes an axial groove wick.

5. The heat pipe device according to claim 4, wherein a portion of the first bore includes a porous media wick.

6. The heat pipe device according to claim 1, wherein the third bore includes a porous media wick.

7. The heat pipe device according to claim 6, wherein the third bore includes the porous media wick in areas of heat flux greater than 15 W/cm$^2$ and a grooved wick in areas of heat delivery.

8. The heat pipe device according to claim 1, wherein the second bore or the third bore is in thermal contact with the first bore.

9. The heat pipe device according to claim 1, wherein the third bore is a porous media bore.

10. The heat pipe device according to claim 9, wherein the heat pipe device is a dual bore heat pipe device with the second bore and the first bore.

11. The heat pipe device according to claim 9, wherein the heat pipe device is a dual bore heat pipe device with the third bore and the first bore.

12. The heat pipe device according to claim 9, wherein the heat pipe device is a triple bore heat pipe device with the first bore, the second bore and the third bore.

13. A heat pipe device adapted for use in microgravity comprising at least two of the following:
   a first bore being an axially grooved bore having opposed ends, the first bore having a first capacity for accepting heat flux from an external environment between the opposed ends of the first bore, and a first capacity for thermal storage;
   a second bore having a second capacity for accepting heat flux from the external environment, a second capacity for thermal storage, and internal fins to enhance heat transfer, the second bore being less than completely filled with liquid phase change material at a predetermined temperature, the phase change material operating between a liquid state and a solid state; and
   a third bore being a porous media bore and having opposed ends, the third bore having a third capacity for accepting heat flux from the external environment greater than 15 W/cm$^2$ between the opposed ends of the third bore, and a third capacity for thermal storage,
   wherein:
      the first capacity for accepting heat flux from the external environment is less than the third capacity for accepting heat flux from the external environment;
      the second capacity for thermal storage is greater than the first capacity for thermal storage and is greater than the third capacity for thermal storage;
      the first bore is arranged and disposed to transfer thermal energy farther than the second bore and the third bore;
      the second bore is arranged and disposed to store more thermal energy than the first bore and the third bore; and
      the third bore is arranged and disposed to accept greater heat flux than the first bore and the second bore.

14. The heat pipe device according to claim 13, wherein the fins in the second bore run along the axis of the second bore, and are continuous.

15. The heat pipe device according to claim 13, wherein the spacing between the fins is less than 0.025 inch.

16. The heat pipe device according to claim 13, wherein the third bore includes a porous media wick in areas of heat flux greater than 15 W/cm$^2$ and a grooved wick in areas of heat delivery.

17. The heat pipe device according to claim 13, wherein the first bore includes an axial groove wick.

18. The heat pipe device according to claim 17, wherein a portion of the first bore includes a porous media wick.

19. A heat pipe device adapted for use in microgravity comprising at least two of the following:
   a first bore being an axially grooved bore having opposed ends and an axial groove wick, the first bore having a first capacity for accepting heat flux from an external environment between the opposed ends of the first bore, and a first capacity for thermal storage;

a second bore having a second capacity for accepting heat flux from the external environment, a second capacity for thermal storage, and internal fins to enhance heat transfer, the second bore being less than completely filled with liquid phase change material at a predetermined temperature, the phase change material operating between a liquid state and a solid state, the internal fins extending along the axis of the second bore;

a third bore being a porous media bore and having opposed ends, the third bore having a third capacity for accepting heat flux from the external environment greater than 15 W/cm$^2$ between the opposed ends of the third bore, and a third capacity for thermal storage, the third bore having a porous media wick in areas of heat flux greater than 15 W/cm$^2$, wherein:

the first capacity for accepting heat flux from the external environment is less than the third capacity for accepting heat flux from the external environment;

the second capacity for thermal storage is greater than the first capacity for thermal storage and is greater than the third capacity for thermal storage;

the first bore is arranged and disposed to transfer thermal energy farther than the second bore and the third bore;

the second bore is arranged and disposed to store more thermal energy than the first bore and the third bore; and the third bore is arranged and disposed to accept greater heat flux than the first bore and the second bore.

* * * * *